(12) United States Patent
Gregorio et al.

(10) Patent No.: US 8,994,518 B2
(45) Date of Patent: Mar. 31, 2015

(54) HAPTIC FEEDBACK GENERATION BASED ON RESONANT FREQUENCY

(75) Inventors: Pedro Gregorio, Verdun (CA); Danny A. Grant, Laval (CA); Patrice Favreau, Mascouche (CA); Eric Meunier, Montreal North (CA)

(73) Assignee: Immersion Corporation, San Jose, CA (US)

(*) Notice: Subject to any disclaimer, the term of this patent is extended or adjusted under 35 U.S.C. 154(b) by 950 days.

(21) Appl. No.: 12/955,503

(22) Filed: Nov. 29, 2010

(65) Prior Publication Data

US 2011/0102162 A1 May 5, 2011

Related U.S. Application Data

(63) Continuation of application No. 12/336,231, filed on Dec. 16, 2008, now Pat. No. 7,843,277.

(51) Int. Cl.
| | | |
|---|---|---|
| *G08B 6/00* | (2006.01) | |
| *G06F 3/033* | (2013.01) | |
| *G06F 3/041* | (2006.01) | |
| *H01L 41/00* | (2013.01) | |
| *G01H 1/00* | (2006.01) | |
| *G06F 3/01* | (2006.01) | |
| *G09G 3/296* | (2013.01) | |
| *G01H 11/06* | (2006.01) | |
| *H02N 2/14* | (2006.01) | |

(52) U.S. Cl.
CPC ............... *G06F 3/016* (2013.01); *G06F 3/041* (2013.01); *G09G 3/296* (2013.01); *G01H 11/06* (2013.01); *H02N 2/14* (2013.01); *G06F 2203/013* (2013.01)
USPC ........ 340/407.2; 345/179; 345/173; 345/161; 310/317; 73/579

(58) Field of Classification Search
CPC ..... G06F 3/016; G06F 3/017; G06F 2003/00; G06F 3/0436; G06F 3/01; G06F 2203/013; G06F 3/03547; G06F 3/011; G06F 3/0414; G10H 1/183; G10H 1/187; H02P 25/027; H02P 2209/13; H02P 9/00; H02P 9/14; B06B 2201/55; B06B 1/0207; B06B 3/02; B06B 1/045; B06B 1/0215; B06B 2201/20; B06B 3/00; B06B 2201/30; G01H 9/002; G01H 11/00; G01H 9/006; H04R 17/00; H04R 17/10; H04R 19/005; H04R 23/002; H04R 2217/00; H04R 11/00; H04R 17/005; H04R 11/14; A63F 2300/1037; A63F 2300/105; H01H 13/85; H01H 2003/008; H01H 2215/05
USPC ........ 340/407.2, 384.7, 500, 545.4, 566, 582, 340/7.6, 384.71, 683, 4.12; 345/173, 161, 345/153, 156, 163, 169, 167, 179; 73/579; 310/317, 15, 23, 81, 36; 702/56; 715/702

See application file for complete search history.

(56) References Cited

U.S. PATENT DOCUMENTS

| | | | |
|---|---|---|---|
| 4,479,098 A | 10/1984 | Watson | |
| 5,436,622 A * | 7/1995 | Gutman et al. | ................ 340/7.6 |

(Continued)

FOREIGN PATENT DOCUMENTS

WO  99/63537  12/1999

*Primary Examiner* — Mirza Alam
(74) *Attorney, Agent, or Firm* — Miles & Stockbridge P.C.

(57) ABSTRACT

A system that generates a haptic effect generates a drive cycle signal that includes a drive period and a monitoring period. The drive period includes a plurality of drive pulses that are based on the haptic effect. The system applies the drive pulses to a resonant actuator during the drive period and receives a signal from the resonant actuator that corresponds to the position of a mass in the actuator during the monitoring period.

21 Claims, 6 Drawing Sheets

(56) References Cited

U.S. PATENT DOCUMENTS

| | | | |
|---|---|---|---|
| 5,682,132 A * | 10/1997 | Hiroyoshi et al. | 340/407.1 |
| 6,275,213 B1 | 8/2001 | Tremblay et al. | |
| 6,473,075 B1 * | 10/2002 | Gomes et al. | 345/177 |
| 2002/0177419 A1 * | 11/2002 | Hwang | 455/90 |
| 2004/0104625 A1 * | 6/2004 | Wakuda et al. | 310/15 |
| 2005/0052415 A1 * | 3/2005 | Braun et al. | 345/161 |
| 2006/0119573 A1 * | 6/2006 | Grant et al. | 345/156 |
| 2006/0290662 A1 * | 12/2006 | Houston et al. | 345/156 |

* cited by examiner

HAPTIC FEEDBACK GENERATION BASED ON RESONANT FREQUENCY

RELATED APPLICATION

This application is a continuation of U.S. patent application Ser. No. 12/336,231, filed on Dec. 16, 2008, the specification of which is hereby incorporated by reference.

FIELD OF THE INVENTION

One embodiment is directed generally to a user interface for a device, and in particular to generating haptic feedback for the user interface.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

In order to generate vibration effects, many devices utilize some type of actuator. Known actuators used for this purpose include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys. Many of these actuators, and the devices that they interact with, have built-in resonant frequencies that optimally are dynamically determined and controlled so that drive signals that generate the haptic effects can be most effective and efficient.

SUMMARY OF THE INVENTION

One embodiment is a system that generates a haptic effect. The system generates a drive cycle signal that includes a drive period and a monitoring period. The drive period includes a plurality of drive pulses that are based on the haptic effect. The system applies the drive pulses to a resonant actuator during the drive period and receives a signal from the resonant actuator that corresponds to the position of a mass in the actuator during the monitoring period.

DETAILED DESCRIPTION

Figure 1:
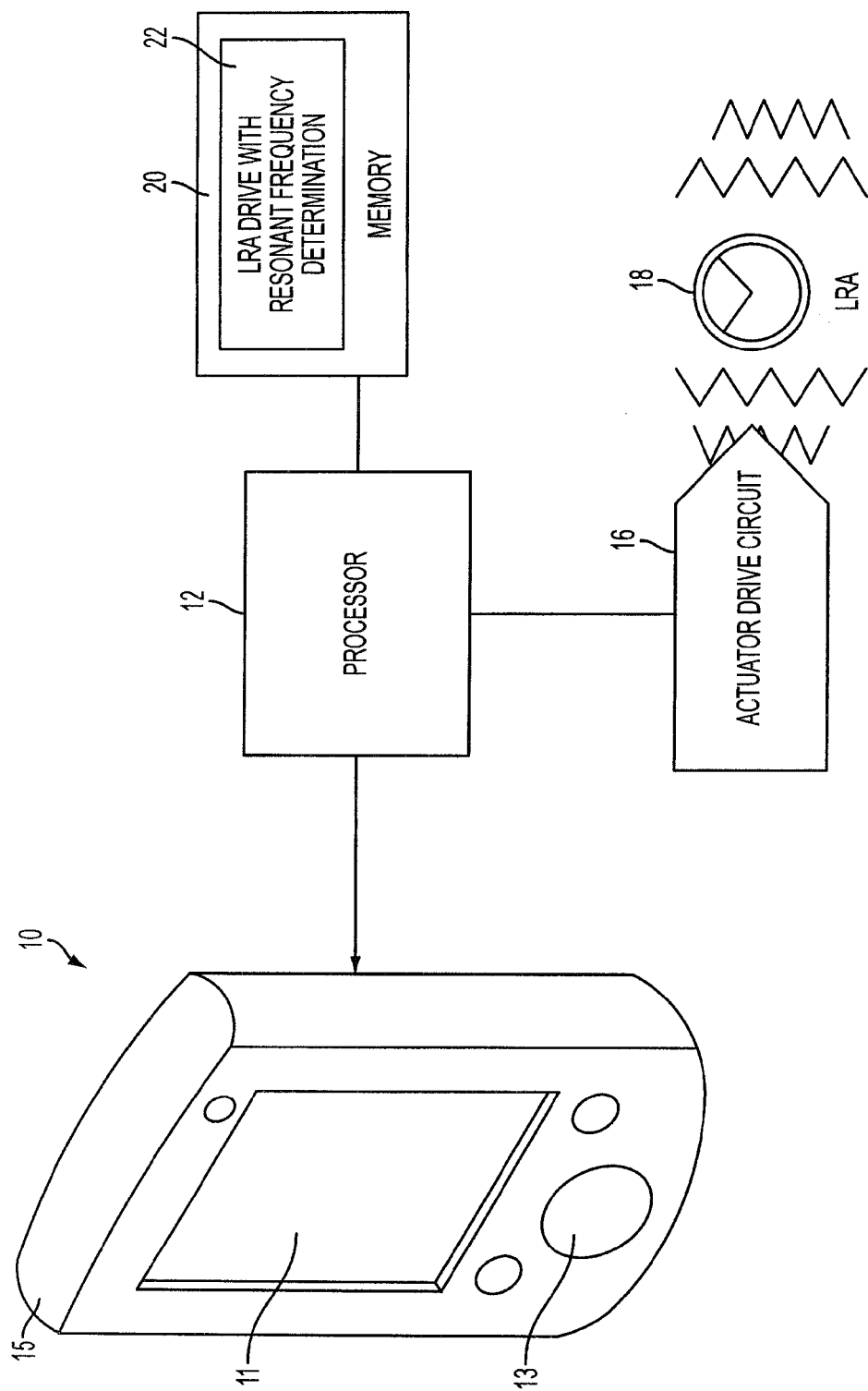
FIG. 1 is a block diagram of a haptically-enabled system in accordance with one embodiment.

One embodiment is a system that drives an LRA to generate vibrotactile haptic feedback on a user interface or other area of a device. The system drives the LRA so that the resonant frequency of the LRA can be determined during a drive period and the drive signal can be adjusted to maximize the haptic feedback based on the determined resonant frequency FIG. 1 is a block diagram of a haptically-enabled system 10 in accordance with one embodiment. System 10 includes a touch sensitive surface 11 or other type of user interface mounted within a housing 15, and may include mechanical keys/buttons 13. Internal to system 10 is a haptic feedback system that generates vibrations on system 10. In one embodiment, the vibrations are generated on touch surface 11.

The haptic feedback system includes a processor 12. Coupled to processor 12 is a memory 20 and an actuator drive circuit 16, which is coupled to an LRA actuator 18. Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

Processor 12 outputs the control signals to drive circuit 16 which includes electronic components and circuitry used to supply LRA 18 with the required electrical current and voltage to cause the desired haptic effects. System 10 may include more than one LRA 18, and each LRA may include a separate drive circuit 16, all coupled to a common processor 12. Memory device 20 can be any type of storage device or computer-readable medium, such as random access memory ("RAM") or read-only memory ("ROM"). Memory 20 stores instructions executed by processor 12. Among the instructions, memory 20 includes an LRA Drive with Resonant Frequency Determination module 22 which are instructions that, when executed by processor 12, generate drive signals for LRA 18 while also determining the resonant frequency of LRA 18 and adjusting the drive signals accordingly. The functionality of module 22 is discussed in more detail below. Memory 20 may also be located internal to processor 12, or any combination of internal and external memory.

Touch surface 11 recognizes touches, and may also recognize the position and magnitude of touches on the surface. The data corresponding to the touches is sent to processor 12, or another processor within system 10, and processor 12 interprets the touches and in response generates haptic effect signals. Touch surface 11 may sense touches using any sensing technology, including capacitive sensing, resistive sensing, surface acoustic wave sensing, pressure sensing, optical sensing, etc. Touch surface 11 may sense multi-touch contacts and may be capable of distinguishing multiple touches that occur at the same time. Touch surface 11 may be a touchscreen that generates and displays images for the user to interact with, such as keys, dials, etc., or may be a touchpad with minimal or no images.

System 10 may be a handheld device, such as a cellular telephone, PDA, computer tablet, etc. or may be any other type of device that provides a user interface and includes a haptic effect system that includes one or more LRAs. The user interface may be a touch sensitive surface, or can be any other type of user interface such as a mouse, touchpad, mini-joystick, scroll wheel, trackball, game pads or game controllers, etc. In embodiments with more than one LRA, each LRA may have a different resonant frequency in order to create a wide range of haptic effects on the device. Each LRA may be any type of resonant actuator.

Figure 2:
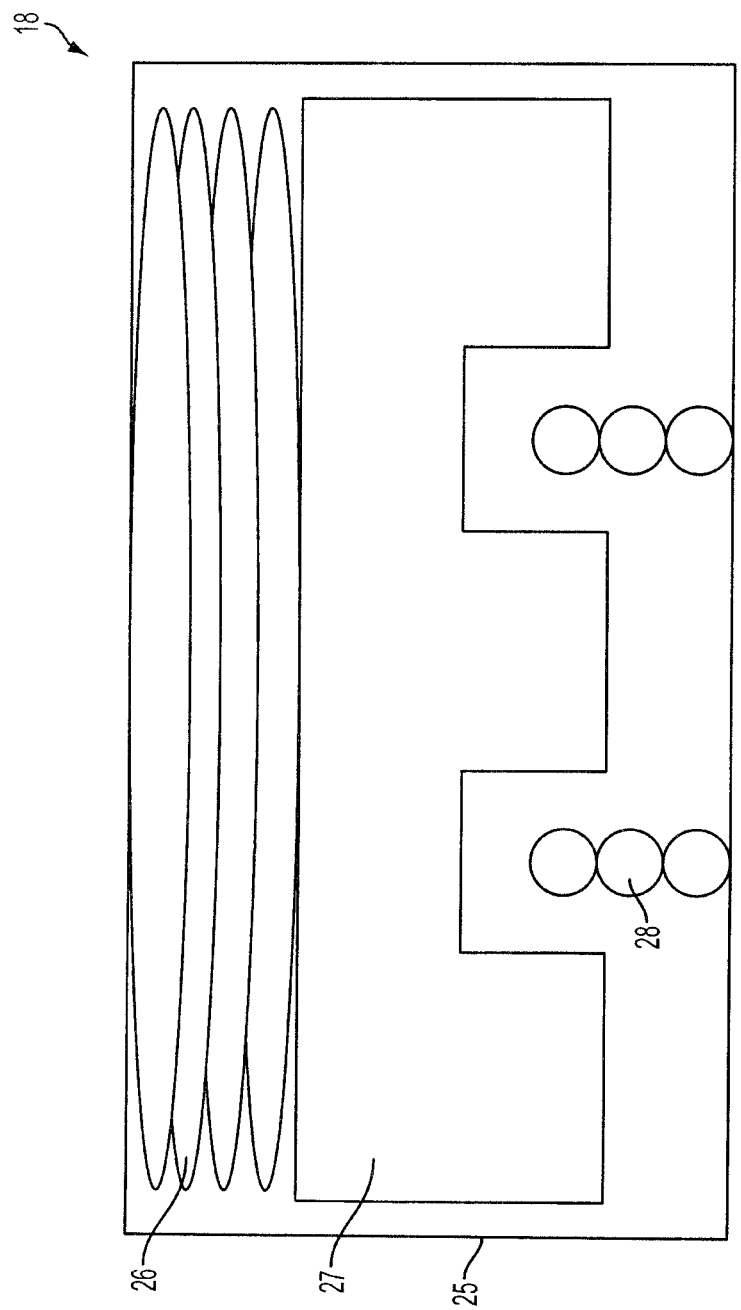
FIG. 2 is a cut-away side view of an LRA in accordance to one embodiment.

FIG. 2 is a cut-away side view of LRA 18 in accordance to one embodiment. LRA 18 includes a casing 25, a magnet/mass 27, a linear spring 26, and an electric coil 28. Magnet 27 is mounted to casing 25 by spring 26. Coil 28 is mounted directly on the bottom of casing 25 underneath magnet 27. LRA 18 is typical of any known LRA. In operation, when current flows thru coil 28 a magnetic field forms around coil 28 which in interaction with the magnetic field of magnet 27 pushes or pulls on magnet 27. One current flow direction/polarity causes a push action and the other a pull action. Spring 26 controls the up and down movement of magnet 27 and has a deflected up position where it is compressed, a deflected down position where it is expanded, and a neutral or zero-crossing position where it is neither compressed or deflected and which is equal to its resting state when no current is being applied to coil 28 and there is no movement/oscillation of magnet 27.

For LRA 18, a mechanical quality factor or "Q factor" can be measured. In general, the mechanical Q factor is a dimensionless parameter that compares a time constant for decay of an oscillating physical system's amplitude to its oscillation period. The mechanical Q factor is significantly affected by mounting variations. The mechanical Q factor represents the ratio of the energy circulated between the mass and spring over the energy lost at every oscillation cycle. A low Q factor means that a large portion of the energy stored in the mass and spring is lost at every cycle. In general, a minimum Q factor occurs with system 10 is held firmly in a hand due to energy being absorbed by the tissues of the hand. The maximum Q factor generally occurs when system 10 is pressed against a hard and heavy surface that reflects all of the vibration energy back into LRA 18.

In direct proportionality to the mechanical Q factor, the forces that occur between magnet/mass 27 and spring 26 at resonance are typically 10-100 times larger than the force that coil 28 must produce to maintain the oscillation. Consequently, the resonant frequency of LRA 18 is mostly defined by the mass of magnet 27 and the compliance of spring 26. However, when an LRA is mounted to a floating device (i.e., system 10 held softly in a hand), the LRA resonant frequency shifts up significantly. Further, significant frequency shifts can occur due to external factors affecting the apparent mounting weight of LRA 18 in system 10, such as a cell phone flipped open/closed or the phone held tightly. Further, it is difficult using known manufacturing techniques to manufacture an LRA with a known resonant frequency within a tight tolerance. Therefore, known uses of LRA typically must assume a fixed resonant frequency at all times, which does not take into account changing resonant frequency due to different uses of a device or due to manufacturing tolerances. Since the assumption of the resonant frequency is typically inaccurate, the subsequent use of the LRA to generate haptic feedback is typically inefficient and not as effective as possible.

One embodiment of the present invention constantly and dynamically determines the resonant frequency of LRA 18 during a monitoring period of a drive signal cycle. A drive signal cycle includes a drive period where drive signal pulses are applied to LRA 18, and a monitoring period where the back electromagnetic field ("EMF") of the moving mass 27 is received and used to determine the resonant frequency of the LRA. The drive signal pulses incorporate the desired haptic effect so that they are translated by LRA 18 into the haptic effect. In one embodiment, LRA 18 includes a sensing coil, Hall sensor, optical sensor or other type of sensing device that is located in proximity to mass 27 for detecting the position of mass 27. In this embodiment, the sensing device will provide a sensed position signal that can be used as the monitoring signal to provide information about the position of the mass 27 instead of the back EMF signal generated by the mass and drive coil of the LRA itself.

Figure 3:
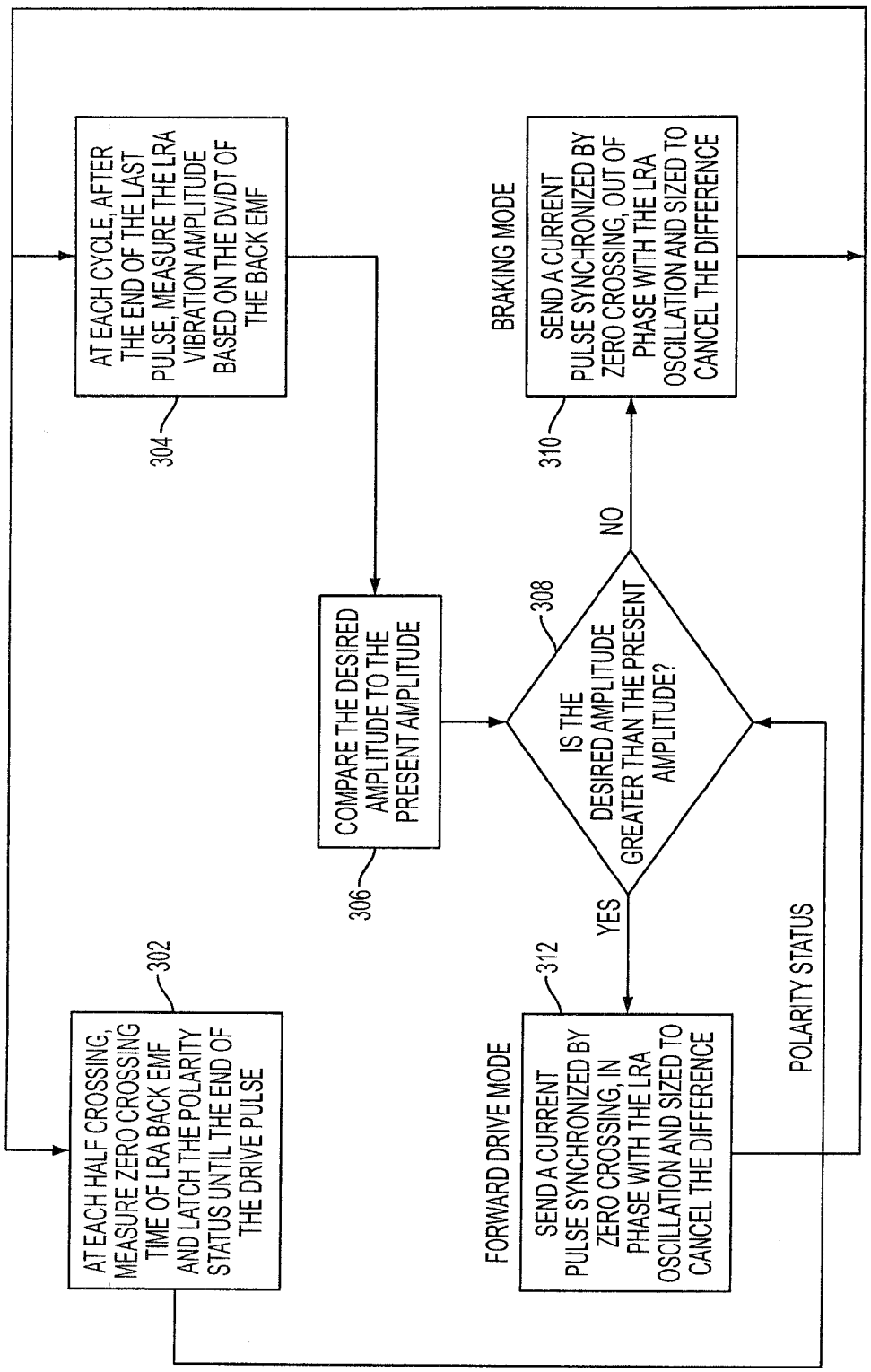
FIG. 3 is a flow diagram of the functionality of a module in conjunction with a processor and an actuator drive circuit when driving LRA to generate haptic feedback accordance with one embodiment.

FIG. 3 is a flow diagram of the functionality of module 22 in conjunction with processor 12 and actuator drive circuit 16 when driving LRA 18 to generate haptic feedback. The functionality of FIG. 3, and FIG. 6 below, is executed as a continuous loop during a drive cycle that includes a drive period and a monitoring period. When the functionality of FIG. 3 is initially executed, a resonant frequency for LRA 18 is assumed. During the drive period (approximately 90%) of the drive cycle, a drive pulse in the form of a square wave is applied to LRA 18, and during the monitoring period (approximately 10%) of the drive cycle, drive circuit 16 "listens" or monitors and receives magnetic back EMF (i.e., the voltage generated by the internal motion inside LRA 18) from LRA 18. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, at each half crossing of the drive pulse (i.e., when the square wave pulse goes from positive to negative and vice versa), the zero crossing time of the LRA back EMF is measured and the polarity status is latched until the end of the drive pulse.

At 304, during each drive cycle, after the end of the last drive pulse (i.e., during the monitoring portion of the drive cycle), the LRA vibration amplitude is measured based on the derivative of the speed of the mass ("dv/dt"), which is based on the back EMF. The derivative of the speed of the mass provides a measurement of how far the mass will rise above the zero crossing.

At 306, the desired amplitude is compared to the present amplitude as determined at 304.

At 308, it is determined if the desired amplitude is greater than the present amplitude. Decision block 308 also is provided as input the polarity status from 302. Based on the decision at 308, functionality proceeds to forward drive mode at 312 because the amplitude of the mass needs to be increased, or braking mode at 310 because the amplitude of the mass needs to be decreased.

At 312, a drive pulse is sent that is synchronized by the zero crossing and in phase with the LRA oscillation. The drive pulse is sized to cancel the difference between the present amplitude and the desired amplitude.

At 310, a drive pulse is sent that is synchronized by the zero crossing and out of phase with the LRA oscillation. The drive pulse is sized to cancel the difference between the present amplitude and the desired amplitude.

Figure 4:
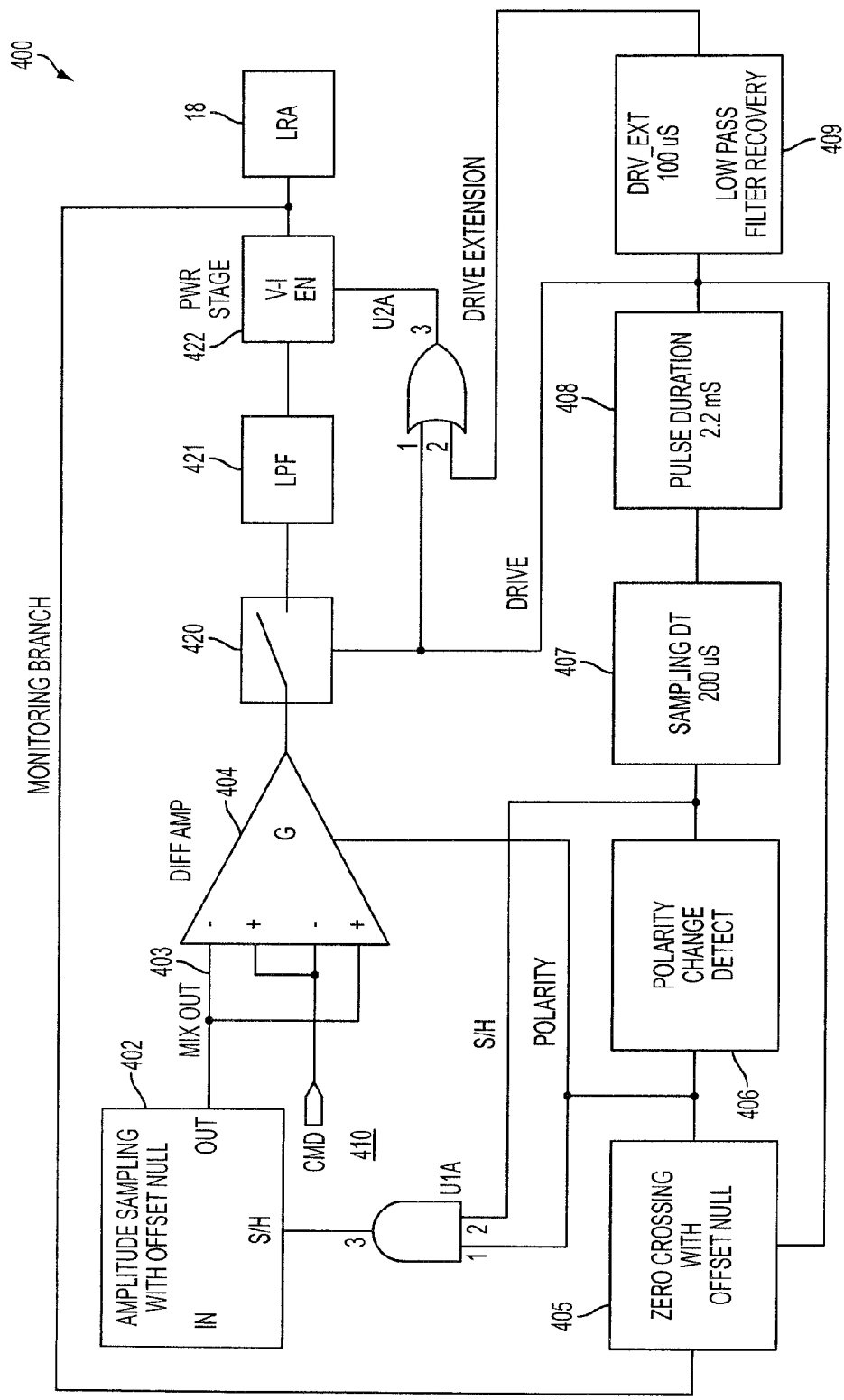
FIG. 4 is a block diagram of a circuit for generating the functionality of FIG. 3 for driving the LRA in accordance with one embodiment.

FIG. 4 is a block diagram of a circuit 400 for generating the functionality of FIG. 3 for driving LRA 18 in accordance with one embodiment. In the embodiment of FIG. 4, the driving signal is generated primarily in hardware as opposed to FIG. 3 which can be generated by any combination of software (via module 22) or hardware.

Circuit 400 is controlled by a "command" signal 410 that is converted from a Pulse-width modulation ("PWM"). When command 410 exceeds a starting threshold and becomes "valid" it initiates a "kick" pulse that is an initiation of the first drive pulse. If LRA 18 was stopped for any reason while command 410 was valid a kick pulse would be issued every 10 ms.

During a drive cycle, the drive pulse has a duration of approximately 2.2 ms generated by pulse duration 408, and it is then followed by an approximately 100 ms delay generated by drive extension 409 that allows the drive pulse to go back to zero. During this 100 ms monitoring period, the LRA back EMF is transmitted along monitoring branch 430 to Zero Crossing with Offset Null circuit 405. Circuit 405 waits for a zero crossing. This edge initiates a 200 ms sampling amplitude delay 407 that will restart a new pulse. Further, when an edge is detected, the polarity of the transition is latched in latch 406 for the next pulse and sampling logic.

Circuit 405 includes a comparator and two analog switches. When the pulse driven is active via switch 420, the negative input is connected back to the output, thereby nulling the offset of the comparator. Offset nulling is needed in one embodiment because the back EMF amplitude may be generally low, especially after the first pulse. An excessively positive offset would make the detection of the edge too early, thereby increasing the frequency of the system. However, if the offset were excessively negative the edge would never be detected and the pulses would stop.

Amplitude sampling with offset null circuit 402 includes an operational amplifier and three analog switches. Circuit 402 measures the difference of amplitude between the time the zero crossing is detected until the end of the sampling period, which last approximately 200 ms. Circuit 402 also nulls the amplifier offset. Offsets increase amplitude errors and decrease the performance at braking.

Dual differential amplifier circuit 404 includes an operational amplifier and double pole, double throw ("DPDT") analog switch. Depending on the polarity, the amplitude of the MIX-OUT signal 403 is subtracted from command 410. The result is sent to a pulse shaping circuit.

The pulse shaping circuit includes an analog switch 420 for shaping the pulse and a filter 421 to smooth the pulse and reduce the high frequency content to avoid excessive audio noise. The filtered pulse is then converted to current by current generator 422.

Driving a current allows for a compensation in a change in impedance variation that would affect the response, in particular at the end of braking. Switch 420 is also used to switch from the drive period (switch is closed) to the monitoring period (switch is open).

Figure 5:
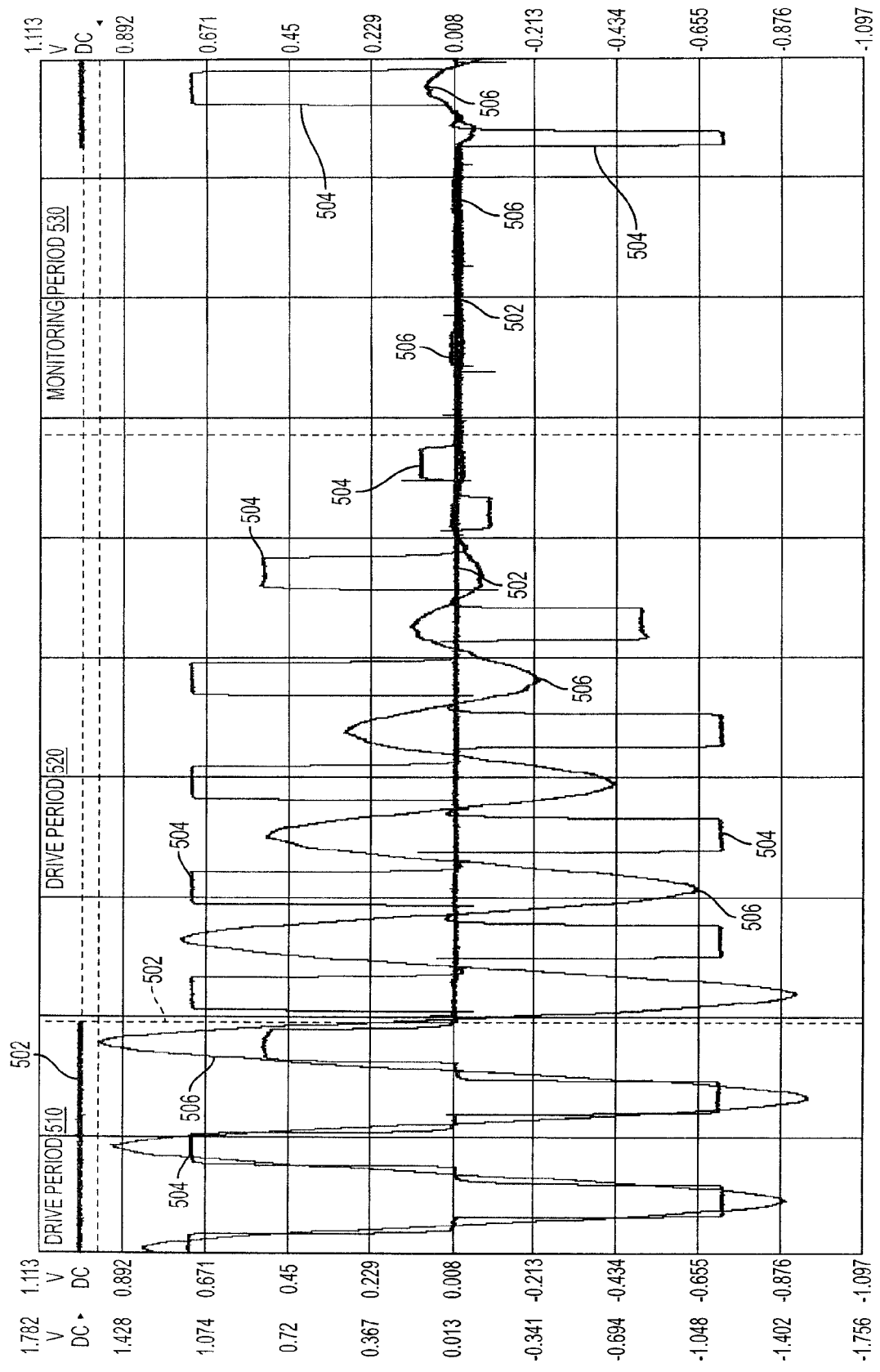
FIG. 5 is a graph that illustrates an example of a portion of a drive cycle that includes a drive period and a monitoring period.

FIG. 5 is a graph that illustrates an example of a portion of a drive cycle that includes a drive period and a monitoring period. A command signal 502 (which corresponds to command signal 410 of FIG. 4) transitions between periods 510 and 520. A drive signal 504 is a square wave that is active during drive pulse periods 510 and 520, and inactive during monitoring period 530. Drive signal 504 is applied to LRA 18 of FIG. 4. An output signal 506 gradually is reduced in amplitude but is still active during monitoring period 530 due to the back EMF generated by the moving mass of LRA 18. Output signal 506 is what is transmitted along monitoring branch 430 of FIG. 4.

Figure 6:
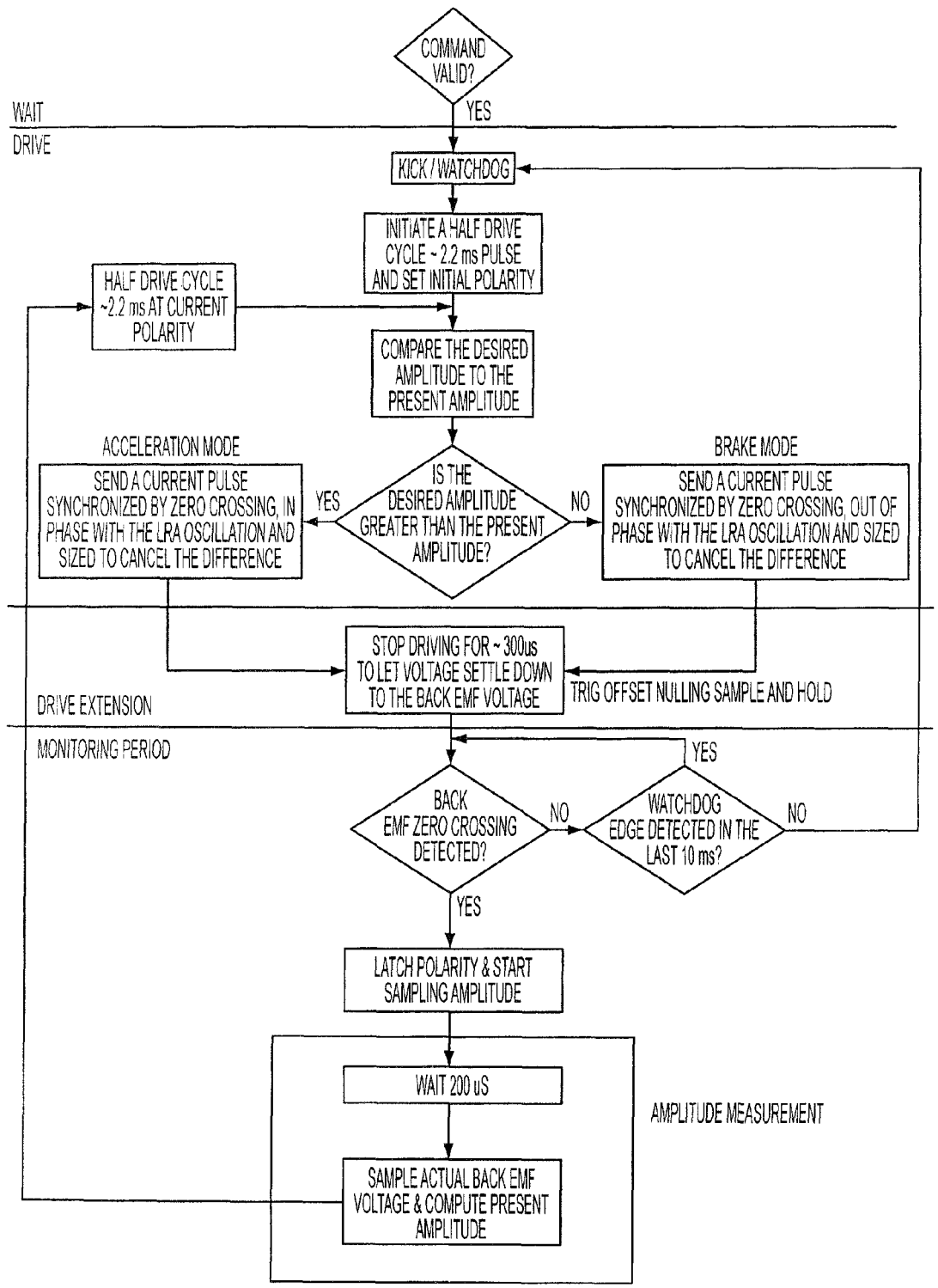
FIG. 6 is a flow diagram of the functionality of a module in conjunction with a processor and an actuator drive circuit when driving LRA to generate haptic feedback accordance with one embodiment.

FIG. 6 is a flow diagram of the functionality of module 22 in conjunction with processor 12 and actuator drive circuit 16 when driving LRA 18 to generate haptic feedback in accordance with one embodiment.

As disclosed, the drive circuit in accordance with one embodiment generates haptic feedback with an LRA by including a monitoring period where the resonant frequency of the LRA is determined. The subsequent drive pulses are then adjusted to account for the resonant frequency.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed:

1. A method of controlling an actuator having a resonant frequency, the method comprising:
    generating a haptic effect drive signal that comprises a drive period and a monitoring period, wherein the monitoring period comprises receiving an output signal from the actuator, the output signal comprising back electromagnetic field (EMF) of the actuator;
    during the drive period, applying one or more drive signal pulses to the actuator, measuring a zero crossing time of the back EMF and latching a polarity status; and
    during the monitoring period, determining the resonant frequency of the actuator comprising monitoring the actuator when drive signal pulses are not applied to the actuator, wherein the determined resonant frequency is based at least on received back EMF.

2. The method of claim 1, wherein the actuator is coupled to a handheld device, and wherein the applying one or more drive signal pulses causes the actuator to generate a haptic effect on the handheld device.

3. The method of claim 2, wherein the handheld device comprises a multi-touch touchscreen.

4. The method of claim 2, wherein the handheld device comprises a second actuator, further comprising:
    generating a second drive signal that comprises a second drive period and a second monitoring period;
    during the second drive period, applying one or more second drive signal pulses to the second actuator; and
    during the second monitoring period, determining a second resonant frequency of the second actuator.

5. The method of claim 1, wherein the actuator comprises a moving mass, and the back EMF comprises voltage generated by the moving mass.

6. The method of claim 5, further comprising determining a speed of the moving mass based on the back EMF.

7. The method of claim 1, further comprising adjusting a subsequent drive signal based on the determined resonant frequency.

8. An apparatus comprising:
    an actuator;
    a controller coupled to the actuator, the controller adapted to:
    generate a haptic effect drive signal that comprises a drive period and a monitoring period, wherein the monitoring period comprises receiving an output signal from the actuator, the output signal comprising back electromagnetic field (EMF) of the actuator;

during the drive period, apply one or more drive signal pulses to the actuator, measuring a zero crossing time of the back EMF and latching a polarity status; and during the monitoring period, determine resonant frequency of the actuator comprising monitoring the actuator when drive signal pulses are not applied to the actuator, wherein the determined resonant frequency is based at least on received back EMF.

9. The apparatus of claim 8, wherein the actuator is coupled to a handheld device, and wherein the apply one or more drive signal pulses causes the actuator to generate a haptic effect on the handheld device.

10. The apparatus of claim 9, wherein the handheld device comprises one of a mobile telephone, a computer tablet, or a personal digital assistance.

11. The apparatus of claim 9, wherein the handheld device comprises a user interface that comprises one of a touch sensitive surface, a mouse, a touchpad, a mini-joystick, a game pad, a trackball, a scroll wheel or a game controller.

12. The apparatus of claim 8, wherein the actuator is a linear resonant actuator.

13. The apparatus of claim 8, wherein the actuator is a piezoelectric actuator.

14. The apparatus of claim 8, further comprising a second actuator, the controller further adapted to:

generate a second drive signal that comprises a second drive period and a second monitoring period;

during the second drive period, apply one or more second drive signal pulses to the second actuator; and during the second monitoring period, determine a second resonant frequency of the second actuator.

15. The apparatus of claim 8, wherein the actuator comprises a moving mass, and the back EMF comprises voltage generated by the moving mass.

16. The apparatus of claim 15, wherein the controller is adapted to determine a speed of the moving mass based on the back EMF.

17. The apparatus of claim 8, wherein the controller is adapted to adjust a subsequent drive signal based on the determined resonant frequency.

18. A non-transitory computer readable medium having instructions stored thereon that, when executed by a processor, cause the processor to control an actuator having a resonant frequency, the control comprising:

generate a haptic effect drive signal that comprises a drive period and a monitoring period, wherein the monitoring period comprises receiving an output signal from the actuator, the output signal comprising back electromagnetic field (EMF) of the actuator;

during the drive period, apply one or more drive signal pulses to the actuator, measuring a zero crossing time of the back EMF and latching a polarity status; and during the monitoring period, determine resonant frequency of the actuator comprising monitoring the actuator when drive signal pulses are not applied to the actuator, wherein the determined resonant frequency is based at least on received back EMF.

19. The non-transitory computer readable medium of claim 18, wherein the actuator comprises a moving mass, and the back EMF comprises voltage generated by the moving mass.

20. The non-transitory computer readable medium of claim 19, the control further comprises determine a speed of the moving mass based on the back EMF.

21. The non-transitory computer readable medium of claim 18, the control further comprises adjust a subsequent drive signal based on the determined resonant frequency.

\* \* \* \* \*